United States Patent
Choi

(10) Patent No.: US 11,983,274 B1
(45) Date of Patent: May 14, 2024

(54) PROCESSING DEVICE AND METHOD FOR SECURE BOOTING THEREOF

(71) Applicant: REBELLIONS INC., Seongnam-si (KR)

(72) Inventor: Myunghoon Choi, Seongnam-si (KR)

(73) Assignee: REBELLIONS INC., Seongnam-si (KR)

( * ) Notice: Subject to any disclaimer, the term of this patent is extended or adjusted under 35 U.S.C. 154(b) by 0 days.

(21) Appl. No.: 18/511,927

(22) Filed: Nov. 16, 2023

(30) Foreign Application Priority Data

Nov. 22, 2022 (KR) .................. 10-2022-0157678

(51) Int. Cl.
   *G06F 21/57* (2013.01)
   *G06F 9/4401* (2018.01)
   *G06F 21/64* (2013.01)

(52) U.S. Cl.
   CPC .......... *G06F 21/572* (2013.01); *G06F 9/4401* (2013.01); *G06F 21/575* (2013.01); *G06F 21/64* (2013.01)

(58) Field of Classification Search
   CPC ...... G06F 21/572; G06F 21/575; G06F 21/64; G06F 9/4401
   See application file for complete search history.

(56) References Cited

U.S. PATENT DOCUMENTS

| | | | |
|---|---|---|---|
| 2013/0263262 A1 | 10/2013 | Forristal | |
| 2020/0293662 A1* | 9/2020 | Gupta | G06F 8/654 |
| 2022/0092203 A1* | 3/2022 | Khatri | G06F 3/061 |
| 2022/0121750 A1 | 4/2022 | Lee et al. | |
| 2023/0134324 A1* | 5/2023 | Emerson | G06F 21/602 726/26 |

FOREIGN PATENT DOCUMENTS

| | | |
|---|---|---|
| KR | 10-2014-0054204 A | 5/2014 |
| KR | 10-2018-0092596 A | 8/2018 |
| KR | 10-2022-0050290 A | 4/2022 |

* cited by examiner

*Primary Examiner* — Terrell S Johnson
(74) *Attorney, Agent, or Firm* — BROADVIEW IP LAW, PC

(57) ABSTRACT

Provided are a processing device and a method for secure booting thereof, in which the processing device includes a security core that operates a Root of Trust and sequentially performs an integrity check on first firmware and second firmware through the Root of Trust, a main core that sequentially operates the first firmware and the second firmware, a non-volatile memory storing the first firmware and the second firmware, and a first volatile memory that loads the first firmware and the second firmware from a main core domain of the main core and operates the loaded firmware with the main core.

18 Claims, 19 Drawing Sheets

PROCESSING DEVICE AND METHOD FOR SECURE BOOTING THEREOF

CROSS-REFERENCE TO RELATED APPLICATION

This application claims priority under 35 U.S.C. § 119 to Korean Patent Application No. 10-2022-0157678, filed in the Korean Intellectual Property Office on Nov. 22, 2022, the entire contents of which are hereby incorporated by reference.

BACKGROUND

Technical Field

The disclosure relates to a processing device and a method for secure booting thereof. Specifically, the disclosure relates to a processing device that maximizes utilization of a security core of the processing device and a method for secure booting thereof.

Description of the Related Art

The core is a component of a system that operates firmware stored in a memory and performs operations desired by a system user. If the firmware is tampered with by a malicious attack, the overall security of the system may be compromised. Secure booting includes an integrity check process that checks the integrity of the firmware during a booting process.

The integrity check process proceeds sequentially, starting with a Root of Trust which cannot be tampered with, and this series of processes is called a Chain of Trust.

If the core utilization can be further improved in the Chain of Trust process, booting speed and overall device performance will be greatly improved.

SUMMARY

An object of the disclosure is to provide a processing device that efficiently utilizes a security core.

Another object of the disclosure is to provide a method for secure booting of a processing device, which efficiently utilizes a security core.

The objects of the disclosure are not limited to the objects described above, and other objects and advantages of the disclosure that are not described can be understood by the following description and will be more clearly understood by the examples of the disclosure. In addition, it will be readily apparent that the objects and advantages of the disclosure can be realized by the means and combinations thereof indicated in the claims.

A processing device according to some examples of the disclosure may include a security core that operates a Root of Trust and sequentially performs an integrity check on first firmware and second firmware through the Root of Trust, a main core that sequentially operates the first firmware and the second firmware, a non-volatile memory storing the first firmware and the second firmware, and a first volatile memory that loads the first firmware and the second firmware from a main core domain of the main core and operates the loaded firmware with the main core.

In addition, the processing device may further include an immutable memory that stores the Root of Trust, in which contents stored in the immutable memory are not tampered with.

In addition, the security core may transfer the first and second firmware to the first volatile memory after the integrity check on the first and second firmware.

In addition, the security core may include a crypto accelerator that accelerates an encryption operation.

In addition, the security core may further include a main-security interface that controls data transfer from the main core to the security core.

In addition, the security core may further include a security-main interface that controls data transfer from the security core to the main core.

In addition, the main-security interface and the main-security interface may be accessible to the main core and the security core, and the immutable memory interface may be accessible to the security core and inaccessible to the main core.

In addition, the security core may perform the integrity check on the first firmware before the first firmware is operated.

In addition, the security core may perform the integrity check on the second firmware before the second firmware is operated.

In addition, the operating the first firmware by the main core may be performed in parallel with the integrity check on the second firmware by the security core.

In addition, time of operating the first firmware and time of the integrity check on the second firmware may overlap with each other.

In addition, if at least one of the first and second firmware is tampered with, the security core may stop the operation of the main core.

In addition, after stopping the operation of the main core, the security core may initialize all data in the first volatile memory.

In addition, if the first and second firmware are tampered with, the security core may execute a recovery mode to replace the first and second firmware, and the main core may be limited in operation during the recovery mode.

In addition, if the first and second firmware are normalized, the security core may terminate the recovery mode and resume the operation of the main core.

In addition, the processing device may further include at least one neural processor that receives a task descriptor from the main core and performs a task, and a shared memory shared by the at least one neural processor.

A method for secure booting of a processing device according to some examples of the disclosure may include at a security core, operating a Root of Trust, at the security core, performing an integrity check on first firmware, at a main core, operating the integrity-checked first firmware, while the first firmware is operating, at the security core, performing an integrity check on second firmware, and at the main core, operating the integrity-checked second firmware.

In addition, the operating the first firmware may include loading the first firmware from a main core domain of the main core to a volatile memory, and at the main core, operating the first firmware.

In addition, the operating the Root of Trust at the security core may include operating the Root of Trust in an immutable memory that cannot be tampered with.

In addition, the performing the integrity check on the first firmware at the security core may include decrypting an encryption code of the first firmware with a public key to derive a hash value of the first firmware, wherein the hash value of the first firmware is encrypted with a private key that asymmetrically corresponds to the public key, and checking an integrity of the first firmware through the decrypted hash value.

With the processing device and the method for secure booting thereof, it is possible to increase the efficiency of the entire device by distributing the task of the existing main core, since the security core not only operates the Root of Trust but also performs integrity checks on other firmware.

In addition, if confirming tampering in the firmware, the secure core can initialize data in the volatile memory, thereby maximizing security effect.

In addition to the effects mentioned above, specific effects of the disclosure are described below while explaining specific details for carrying out the disclosure.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

Figure 1:
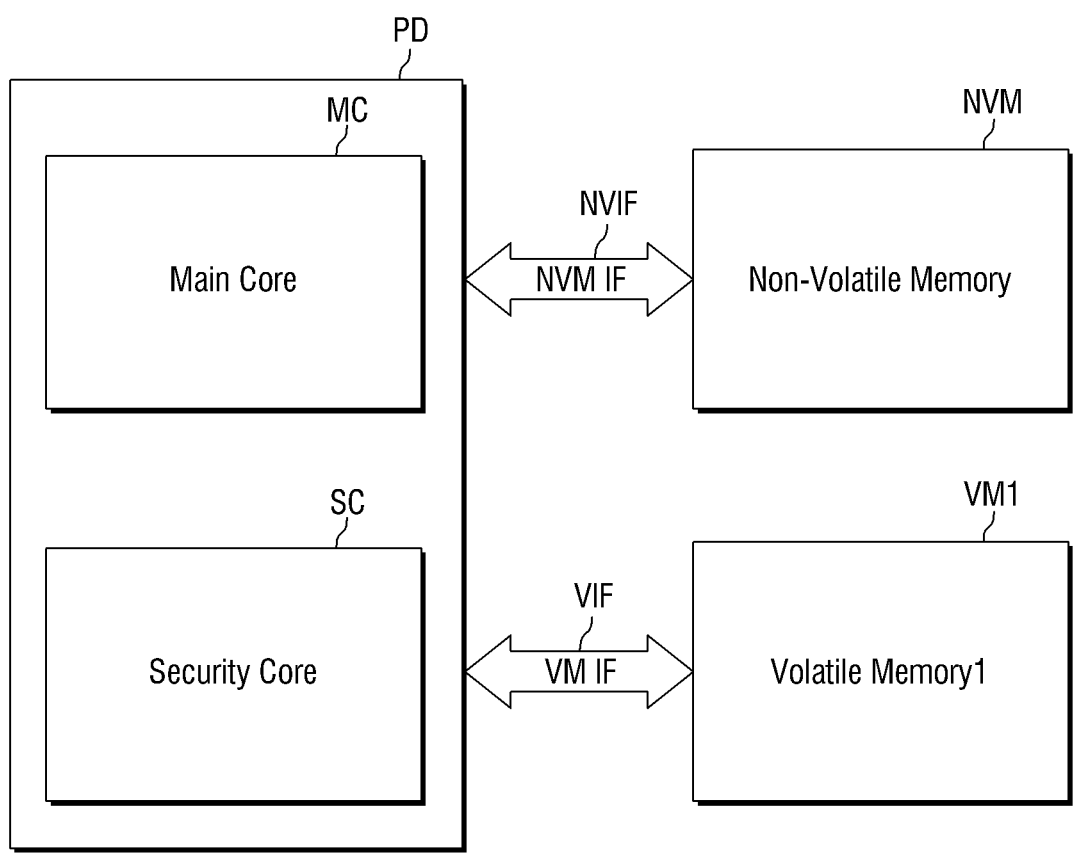
FIG. 1 is a block diagram provided to explain a processing system.

The terms or words used herein should not be construed as limited to their general or dictionary meanings. According to the principle that the inventor can define the concepts of terms or words in order to explain his or her invention in the best way, it should be interpreted with a meaning and concept consistent with the technical idea of the disclosure. In addition, the examples described herein and the configurations shown in the drawings are merely one example for implementing the disclosure, and do not completely represent the technical idea of the disclosure, so it should be understood that there may be various equivalents, modifications, and applicable examples that may replace them at the time of filing this application.

Terms such as first, second, A, B and so on used in this specification and claims may be used in describing a variety of elements, but these elements should not be limited to the expression. The expressions are used only for the purpose of distinguishing one element from another. For example, without departing from the scope of the present disclosure, a first component may be referred to as a second component, and similarly, the second component may also be referred to as the first component. The term "and/or" includes a combination of a plurality of related described items or any of a plurality of related described items.

The terms used herein are merely used to describe specific examples and are not intended to limit the invention. Unless otherwise specified, a singular expression includes a plural expression. It should be understood that terms such as "include" or "have" used herein do not preclude the existence or possibility of addition of features, numbers, steps, operations, components, parts, or combinations thereof described herein.

Unless defined otherwise, all expressions used herein, including technical or scientific expressions, have the same meaning as commonly understood by one of ordinary skill in the art to which the disclosure pertains.

Expressions such as those defined in commonly used dictionaries should be interpreted as having a meaning consistent with the meaning in the context of the relevant art and are to be interpreted as ideal or overly formal in meaning unless explicitly defined in the present application.

In addition, each configuration, process, step, method, or the like included in each example of the disclosure may be shared within the scope of not being technically contradictory to each other.

Hereinafter, a processing device according to some examples of the disclosure will be described with reference to FIGS. 1 to 6.

FIG. 1 is a block diagram provided to explain a processing system.

Referring to FIG. 1, a processing system may include a processing device (PD), a non-volatile memory (NVM), a first volatile memory (VM1), a non-volatile memory interface (NVIF), and a volatile memory interface (VIF).

The processing device (PD) may be a device that performs computational tasks. The processing device (PD) may perform the computational tasks using data and software stored in the non-volatile memory (NVM). The processing device (PD) may also load the data and software to the first volatile memory (VM1) to perform the computational tasks.

The processing device (PD) may boot before performing the computational tasks. Booting of the processing device (PD) may be performed through at least one piece of firmware. The processing device (PD) may perform the computational tasks after the booting task is complete.

The processing device (PD) may include a main core (MC) and a security core (SC). The main core (MC) may be a core that performs the computational tasks of the processing device (PD). Alternatively, the main core (MC) may be a core that manages cores performing computational tasks or distributes tasks. However, aspects are not limited to the above.

The security core (SC) may perform secure booting of the processing device (PD). The secure booting means booting in a secure state, and it may refer to booting through loading and operating a Root of Trust that is free from risk of tampering. In the secure booting procedure, the security core (SC) may verify integrity through a hash algorithm.

Specifically, the security core (SC) may generate an encryption code of the hash value for data to be stored in the non-volatile memory (NVM) using a private key (key) which is an encryption key managed by the security core (SC). The security core (SC) stores both data and encryption code in the non-volatile memory (NVM).

If the secure booting begins, the security core (SC) may regenerate the hash value by decrypting the encryption code through the public key of the encryption keys which asymmetrically corresponds to the private key. In addition, the Security Core (SC) regenerates a hash value for the data and compares the hash value with the hash value already stored in the non-volatile memory (NVM) to determine if the data was tampered with. If the integrity of the firmware is confirmed through secure booting, the firmware is determined to be safe and is moved to the main memory, that is, to the first volatile memory (VM1), and the corresponding firmware is operated by the main core (MC).

The non-volatile memory (NVM) may store firmware for booting the processing device (PD). The non-volatile memory (NVM) has the characteristic of maintaining internal data even without power, so it may be used to store software such as data and firmware. Although the non-volatile memory (NVM) is shown in FIG. 1 as being located external to the processing device (PD), aspects are not limited to the above. That is, the non-volatile memory (NVM) may be combined inside the processing device (PD). The non-volatile memory (NVM) may exchange data with the processing device (PD) through a non-volatile memory interface (NVIF).

The volatile memory (VM) may load the firmware for booting the processing device (PD). The volatile memory (VM) has the characteristic of volatilizing internal data when there is no power, so it may be a memory for using data and software when the main core (MC) and security core (SC) are operated. The volatile memory (VM) may exchange data with the processing device (PD) through the non-volatile memory interface (NVIF).

Figure 2A:
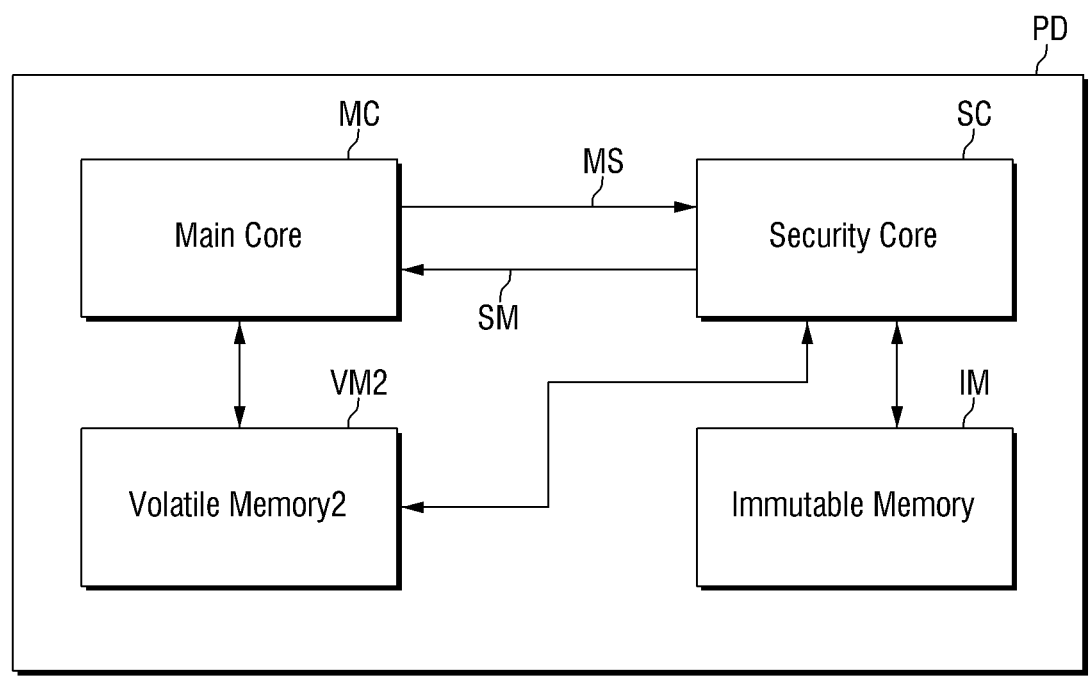
FIG. 2A is a block diagram provided to explain a detailed structure of the processing device of FIG. 1.

FIG. 2A is a block diagram provided to explain a detailed structure of the processing device of FIG. 1.

Referring to FIG. 2A, the processing device may include, in addition to the main core (MC) and the security core (SC), a second volatile memory (VM2), an immutable memory (IM), a main security interconnection (MS), and a security main interconnection (SM).

The second volatile memory (VM2) may be a volatile memory belonging to the domain of the main core (MC), that is, to the main core domain. The main core (MC) may load the firmware to the first volatile memory (VM1) or the second volatile memory (VM2) of FIG. 1 to perform a task.

Although the first volatile memory (VM1) and the second volatile memory (VM2) are shown as being separated from each other, aspects are not limited to the above. The first volatile memory (VM1) and the second volatile memory (VM2) may not be separated but may exist as one memory device.

The second volatile memory (VM2) may also be connected to the security core (SC). The second volatile memory (VM2) may receive the firmware from the security core (SC) after the security core (SC) performs integrity check on the firmware. Accordingly, the main core (MC) may operate the integrity-checked firmware.

The immutable memory (IM) may be a memory that stores data and software that cannot be tampered with. Accordingly, if the firmware in the immutable memory (IM) is operated, its integrity may be guaranteed. The integrity may mean the characteristic that the contents are not tampered with and remain as they were originally stored.

The immutable memory (IM) may store software such as the Root of Trust that cannot be tampered with. The security core (SC) may load software that cannot be tampered with from the immutable memory (IM) to perform secure booting with enhanced security. In addition, data such as a private key of the security keys for secure booting may also be stored in the immutable memory (IM). The immutable memory (IM) may be either Read Only Memory (ROM) or One Time Programmable (OTP) memory, which cannot be tampered with.

The main security interconnection (MS) allows data and control signals to be transferred between the main core (MC) and the security core (SC). The main core (MC) may access only a limited part, not the entire, of the security core (SC), through the main security interconnection (MS). Through this, it is possible to maintain the security of the security core (SC) in charge of security and prevent the risk of tampering with the processing device (PD).

Conversely, the security main interconnection (SM) allows data and control signals to be transferred between the security core (SC) and the main core (MC). The security core (SC) may have a higher security level than the main core (MC). Accordingly, the security core (SC) may access all parts of the main core (MC) and may also indicate whether or not the main core (MC) will be operated. Through this, when security is a problem, the security core (SC) may stop the operation of the main core (MC) and perform the task of the main core (MC) instead. Accordingly, the security core (SC) may smoothly perform recovery when there is a risk of tampering.

Figure 2B:
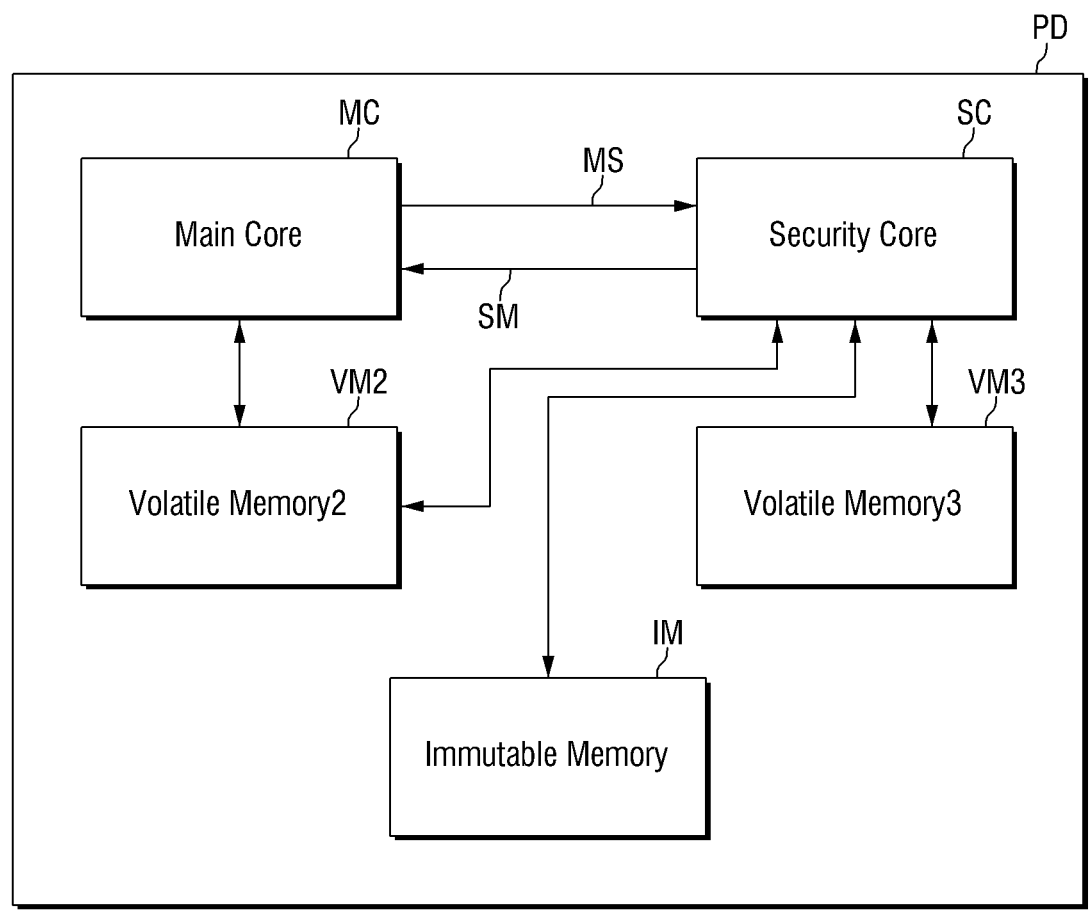
FIG. 2B is a block diagram provided to explain a detailed structure of the processing device of FIG. 1.

FIG. 2B is a block diagram provided to explain a detailed structure of the processing device of FIG. 1.

Referring to FIG. 2B, the processing device (PD) may further include a third volatile memory (VM3). The third volatile memory (VM3) may be a volatile memory belonging to the domain of the security core (SC), that is, to the security core domain. The security core (SC) may load the firmware to the first volatile memory (VM1) or the third volatile memory (VM3) of FIG. 1 to perform a task.

The second volatile memory (VM2) and the third volatile memory (VM3) may be separate volatile memories as shown in FIG. 2B. However, aspects are not limited to the above. The second volatile memory (VM2) and the third volatile memory (VM3) may be divided regions in the same memory, which may correspond to the main core domain and the security core domain, respectively. The security core (SC) may also load the firmware to the third volatile memory (VM3) and operate the same.

Figure 3:
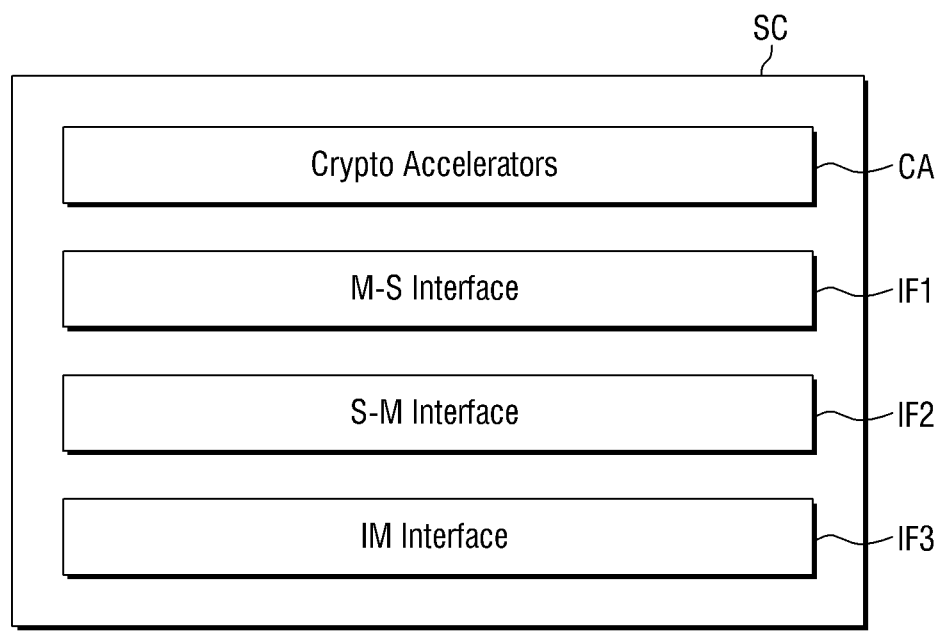
FIG. 3 is a block diagram provided to explain a detailed structure of the security core of FIG. 2A or 2B.

FIG. 3 is a block diagram provided to explain a detailed structure of the security core of FIG. 2.

Referring to FIGS. 2A and 3, the security core (SC) may include a crypto accelerator (CA), a main-security interface (IF1), a security-main interface (IF2), and an immutable memory interface (IF3).

The crypto accelerator (CA) may perform crypto operations. For example, the crypto operations may include at least one of an Advanced Encryption Standard (AES) algorithm, a hash algorithm, a public/private key algorithm, and a true random number generator operation.

The crypto accelerator (CA) may be hardware specialized for crypto operations to allow the security core (SC) to perform crypto operations smoothly. Through this, the security core (SC) may perform crypto operations faster and more accurately when performing secure booting.

The main-security interface (IF1) may be connected to the main security interconnection (MS). The main-security interface (IF1) in conjunction with the main security interconnection (MS) may control such that access is restricted only to areas other than the security area when the main core (MC) accesses the security core (SC).

The security-main interface (IF2) may be connected to the security main interconnection (SM). The security-main interface (IF2) in conjunction with the security main interconnection (SM) may be used when the security core (SC) accesses the main core (MC). The area of the security core (SC) accessible to the main core (MC) may be smaller than the area of the main core (MC) accessible to the security core (SC). Through this asymmetry, it is possible to prepare for the overall risk of tampering by strengthening the security of the security core (SC).

The immutable memory interface (IF3) may control the access of the security core (SC) to the immutable memory (IM). Since the immutable memory (IM) is a non-tamperable area where only the security core (SC) can access, a separate interface for this may be present in the security core (SC).

The main-security interface (IF1), the security-main interface (IF2), and the immutable memory interface (IF3) may be physically separated from each other. The main-security interface (IF1) and the security-main interface (IF2) may be operated between the main core (MC) and the security core (SC). The main-security interface (IF1) and the security-main interface (IF2) may be accessible to the main core (MC) and the security core (SC).

Conversely, the immutable memory interface (IF3) may be accessible only to the security core (SC) and may not be accessible to the main core (MC). Accordingly, since the main core (MC) cannot access the immutable memory (IM), it is possible to prevent the possibility that the data and software stored in the immutable memory (IM) would be tampered with.

Figure 4:
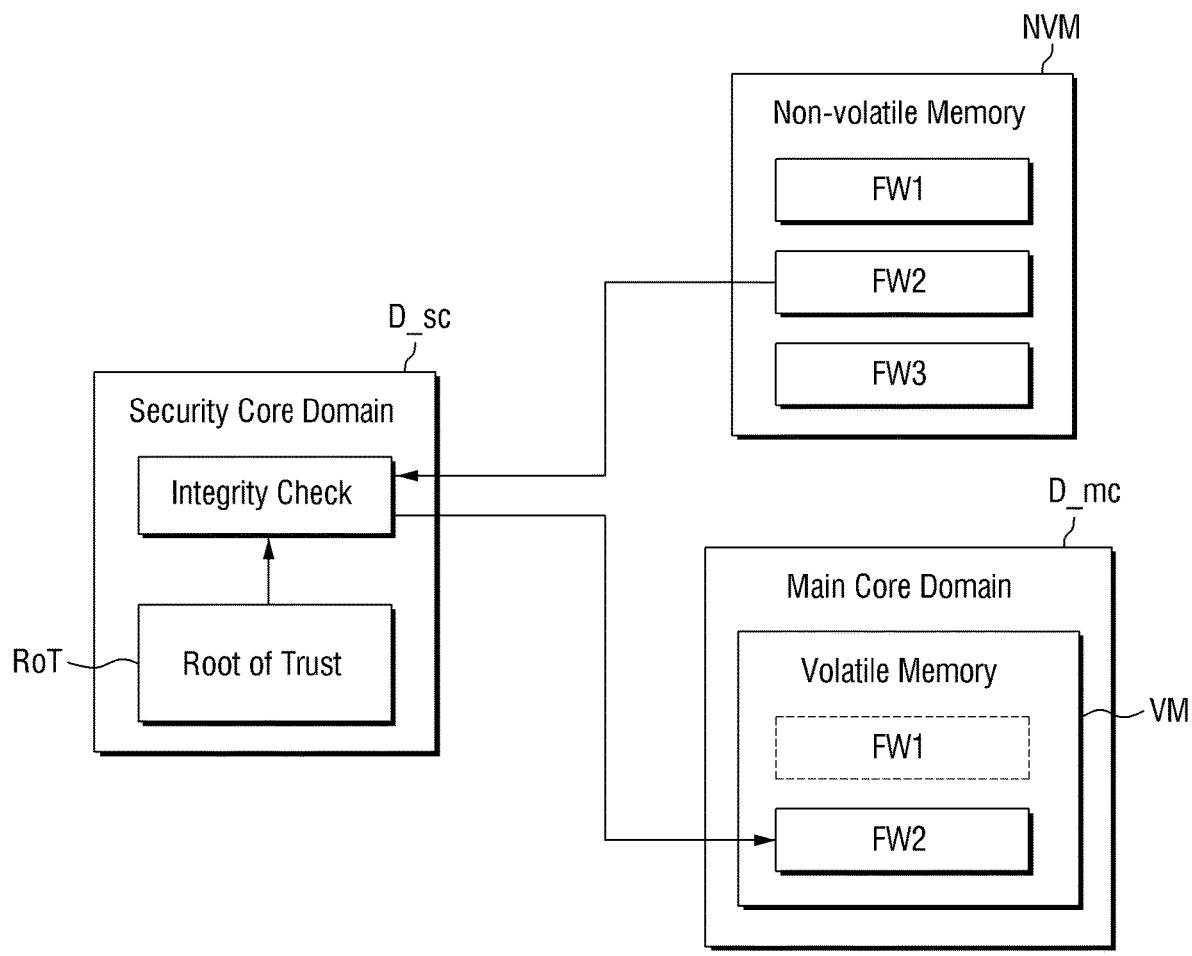
FIG. 4 is a block diagram provided to explain a method for performing an integrity check on firmware in a security core domain and a main core domain.

FIG. 4 is a block diagram provided to explain a method for performing an integrity check on firmware in the security core domain and the main core domain.

Referring to FIGS. 1, 2, and 4, the security core domain (D_sc) may refer to an area on software where the security core (SC) is operated. Likewise, the main core domain (D_mc) may refer to an area on software where the main core (MC) is operated.

The Root of Trust (RoT) may be software stored in the immutable memory (IM). The Root of Trust (RoT) may not be tampered with. Accordingly, the Root of Trust (RoT) is operated first in the entire booting procedure to perform an integrity check on other firmware.

The Root of Trust (RoT) may be loaded to the security core domain (D_sc). Specifically, the security core (SC) may load the Root of Trust (RoT) to the third volatile memory (VM3) and operate the same.

The security core (SC) may check the integrity of the firmware through the Root of Trust (RoT) in the security core domain (D_sc). The non-volatile memory (NVM) may store several pieces of firmware. For example, first firmware (FW1), second firmware (FW2), and third firmware (FW3) may be stored in the non-volatile memory (NVM). Although it is shown in FIG. 4 that three pieces of firmware are stored, aspects are not limited to the above. That is, the number of firmware stored in the non-volatile memory (NVM) may be 2 or less or 4 or more.

The Root of Trust (RoT) may check the integrity of the first firmware (FW1). The first firmware (FW1) may check the integrity of the second firmware (FW2), and the second firmware (FW2) may check the integrity of the third firmware (FW3).

Alternatively, the Root of Trust (RoT) may sequentially check the integrity of the first firmware (FW1), the second firmware (FW2), and the third firmware (FW3). The main core (MC) may load the integrity-checked firmware to the main core domain (D_mc).

The volatile memory (VM) of the main core domain (D_mc) may include at least one of the first volatile memory (VM1) and the third volatile memory (VM3). The main core domain (D_mc) may load the first firmware (FW1) integrity checked by the Root of Trust (RoT) and operate the same. The Root of Trust (RoT) may check the integrity of the second firmware (FW2) and load and operate the second firmware (FW2). The third firmware (FW3) may also be operated later after integrity check by the Root of Trust (RoT) in the same manner.

Figure 5:
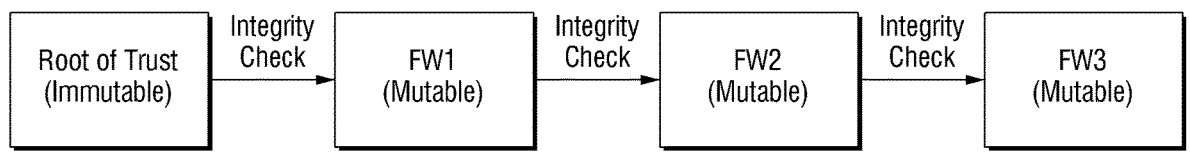
FIG. 5 is a block diagram provided to explain a Chain of Trust.
Figure 6:
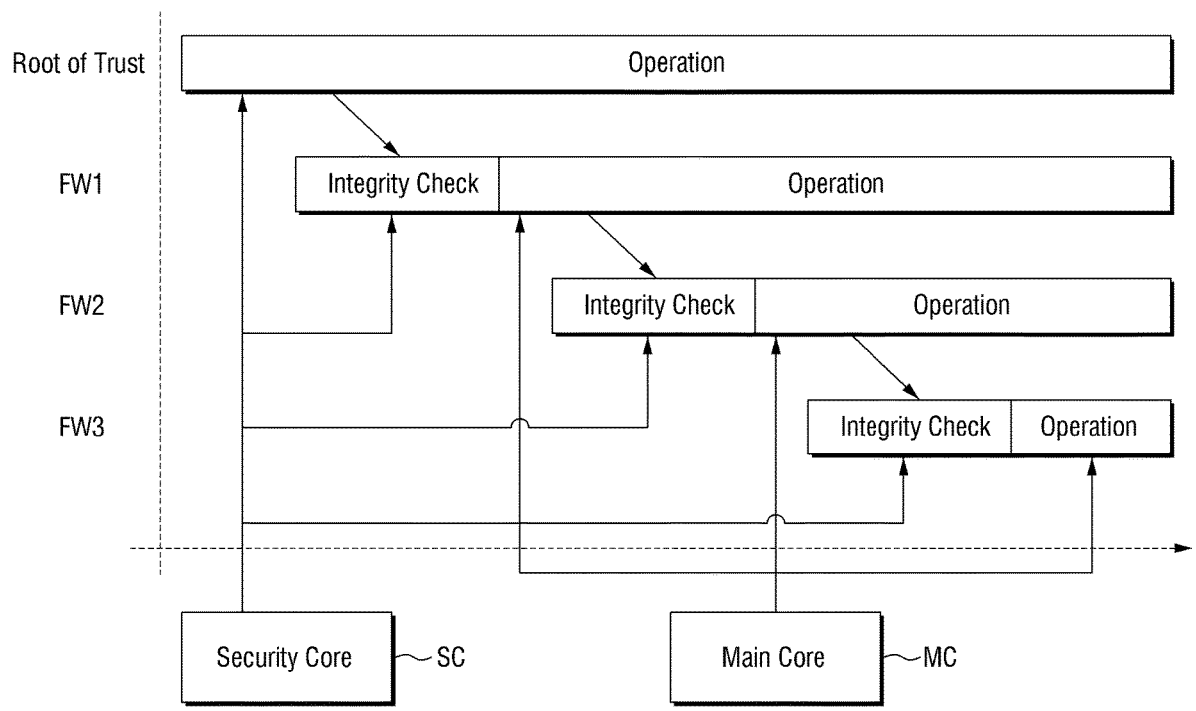
FIG. 6 is a diagram provided to explain operations of a main core and a security core.

FIG. 5 is a block diagram provided to explain the Chain of Trust, and FIG. 6 is a diagram provided to explain the operations of the main core and the security core.

Referring to FIGS. 5 and 6, secure booting may maintain integrity through the Chain of Trust. That is, the Root of Trust (RoT) may perform an integrity check on the first firmware (FW1), and the first firmware (FW1) may subsequently perform an integrity check on the second firmware (FW2). Furthermore, the second firmware (FW2) may perform an integrity check on the third firmware (FW3).

The Root of Trust (RoT) may be immutable software that cannot be tampered with. Conversely, the first firmware (FW1), the second firmware (FW2), and the third firmware (FW3) may all be mutable software that can be tampered with.

The Security Core (SC) may operate the Root of Trust (RoT). The Root of Trust (RoT) operated by the security core (SC) may perform an integrity check on the first firmware (FW1). The main core (MC) may operate the integrity-checked first firmware (FW1).

The operated first firmware (FW1) may perform an integrity check on the second firmware (FW2). The integrity check may be performed by the main core (MC). Conversely, the security core (SC) may perform an integrity check on the second firmware (FW2) through the Root of Trust (RoT). The main core (MC) may operate the integrity-checked second firmware (FW2).

The operated second firmware (FW2) may perform an integrity check on the third firmware (FW3). The integrity check may be performed by the main core (MC). Conversely, the security core (SC) may perform an integrity check on the third firmware (FW3) through the Root of Trust (RoT). The main core (MC) may operate the integrity-checked third firmware (FW3).

Because the integrity of the security core (SC) is guaranteed using the Root of Trust (RoT) and then the integrity of other firmware is successively verified, secured booting is enabled.

In addition, if the security core (SC) checks the integrity of all firmware, the main core (MC) operation and the security core (SC) operation are executed in parallel, thereby maximizing the efficiency and speed of booting. That is, in FIG. 6, the operation time of the first firmware (FW1) and the integrity check time of the second firmware (FW2) overlap with each other and are performed in parallel, thereby eliminating the time consumption when performed serially. Accordingly, the processing device (PD) according to some examples of the disclosure may efficiently perform secured booting.

The security core (SC) may stop the operation of the main core (MC) if firmware tampering occurs during the integrity check. All data in the volatile memory (VM) may be initialized. For example, initialization may include writing all data with zeros. However, aspects are not limited to the above.

The security core (SC) may execute a recovery mode to correct the tampering in the tampered firmware such as the first firmware (FW1), that is, to replace the tampered first firmware (FW1) with normal first firmware (FW1). The operation of the main core (MC) may be limited during recovery mode. Through this, it is possible to minimize the risk of additional tampering during the security recovery operation. Although it is described above that the first firmware (FW1) is tampered with by way of an example, the recovery mode operation may be equally performed in other firmware such as the second firmware (FW2).

The security core (SC) may end the recovery mode when the tampered firmware is normalized. Accordingly, the main core (MC) may resume operation. In this way, if there is a security risk, the security core (SC) may even limit the operation of the main core (MC), thereby maintaining security in the recovery procedure.

Hereinafter, a neural processing device according to some examples of the disclosure will be described with reference to FIGS. 7 to 16. The components or operations that overlap with those of the examples described above will be simplified.

Figure 7:
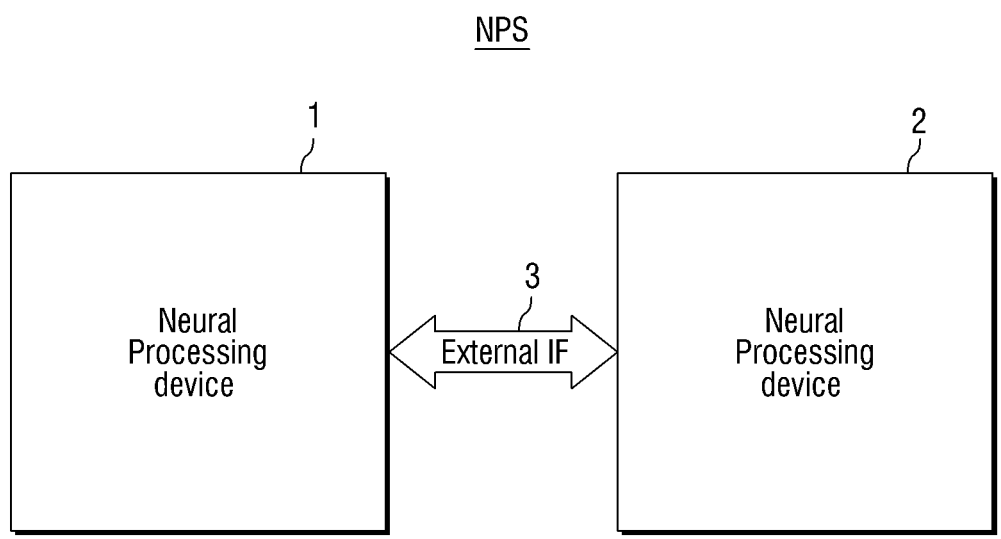
FIG. 7 is a block diagram provided to explain a neural processing system.

FIG. 7 is a block diagram provided to explain a neural processing system.

Referring to FIG. 7, the neural processing system (NPS) may include a first neural processing device 1, a second neural processing device 2, and an external interface 3.

The first neural processing device 1 may be a device that performs computations using an artificial neural network. The first neural processing device 1 may be a device specialized for performing a deep learning computational task, for example. However, aspects are not limited to the above.

The second neural processing device 2 may have a configuration identical or similar to that of the first neural processing device 1. The first neural processing device 1 and the second neural processing device 2 may be connected to each other through the external interface 3 to share data and control signals.

Although FIG. 1 illustrates two neural processing devices, the neural processing system (NPS) is not limited thereto. That is, in the neural processing system (NPS), three or more neural processing devices may be connected to each other through the external interface 3. In addition, conversely, the neural processing system (NPS) may include only one neural processing device.

In this case, each of the first neural processing device 1 and the second neural processing device 2 may be a processing device other than the neural processing device. That is, the first neural processing device 1 and the second neural processing device 2 may be a graphics processing unit (GPU), a central processing unit (CPU), or other types of processing devices, respectively. Hereinafter, for convenience, the first neural processing device 1 and the second neural processing device 2 will be described as the neural processing devices.

Figure 8:
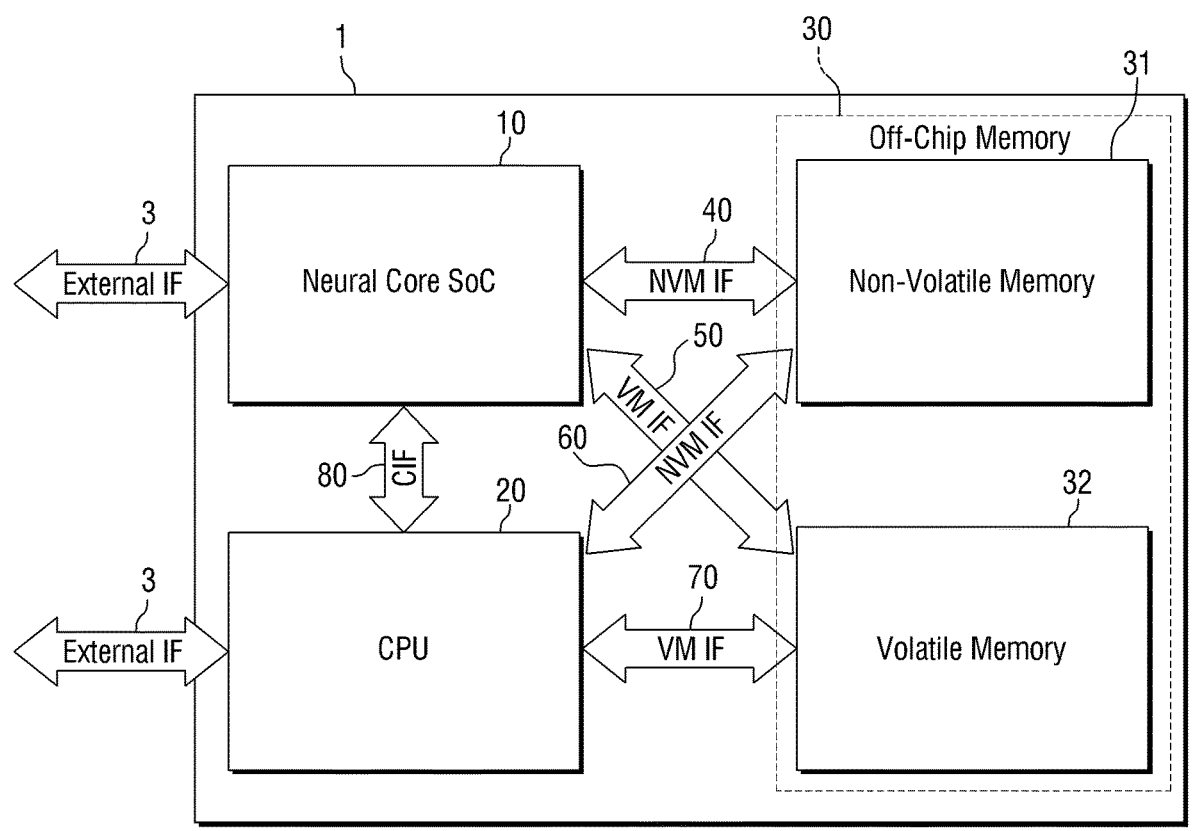
FIG. 8 is a block diagram provided to explain the neural processing device of FIG. 7 in detail.

FIG. 8 is a block diagram provided to explain the neural processing device of FIG. 7 in detail.

Referring to FIG. 8, the first neural processing device 1 may include a neural core SoC 10, a CPU 20, an off-chip memory 30, a first non-volatile memory interface 40, a first volatile memory interface 50, a second non-volatile memory interface 60, a second volatile memory interface 70, and a control interface (CIF) 80.

The neural core SoC 10 may be a System on Chip device. The neural core SoC 10 is an artificial intelligence computational unit and may be an accelerator. The neural core SoC may be any one of a graphics processing unit (GPU), a field programmable gate array (FPGA), and an application-specific integrated circuit (ASIC), for example. However, aspects are not limited to the above.

The neural core SoC 10 may exchange data with other external computational units through the external interface 3. In addition, the neural core SoC 10 may be connected to a non-volatile memory 31 and a volatile memory 32 through the first non-volatile memory interface 40 and the first volatile memory interface 50, respectively.

The CPU 20 may be a controller that controls the system of the first neural processing device 1 and executes the program operations. The CPU 20 is a general-purpose computational unit and may have too low efficiency to perform parallel simple computations widely used in deep learning. Accordingly, the neural core SoC 10 may perform computations for deep learning reasoning and training tasks, thus achieving high efficiency.

The CPU 20 may exchange data with other external computational units through the external interface 3. In addition, the CPU 20 may be connected to the non-volatile memory 31 and the volatile memory 32 through the second non-volatile memory interface 60 and the second volatile memory interface 70, respectively.

The CPU 20 may also pass a task to the neural core SoC 10 in a command. In this case, the CPU 20 may be a kind of host that gives instructions to the neural core SoC 10. That is, the neural core SoC 10 can efficiently perform parallel computational tasks such as deep learning tasks according to the instructions of the CPU 20.

The off-chip memory 30 may be a memory disposed outside a chip of the neural core SoC 10. The off-chip memory 30 may include the non-volatile memory 31 and the volatile memory 32.

The non-volatile memory 31 may be a memory that continuously retains stored information even when there is no power supply. For example, the non-volatile memory 31 may include at least one of a Read-Only Memory (ROM), a Programmable Read-Only Memory (PROM), an Erasable Alterable ROM (EAROM), an Erasable Programmable Read-Only Memory (EPROM), an Electrically Erasable Programmable Read-Only Memory (EEPROM) (e.g., a NAND flash memory, a NOR flash memory), an Ultra-Violet Erasable Programmable Read-Only Memory (UVE-PROM), a Ferroelectric Random Access Memory (FeRAM), a Magnetoresistive Random Access Memory (MRAM), a Phase-change Random Access Memory (PRAM), a silicon-oxide-nitride-oxide-silicon (SONOS), a Resistive Random Access Memory (RRAM), a Nanotube Random Access Memory (NRAM), a magnetic computer storage devices such as hard disks, and a magnetic computer storage device (e.g., hard disk, diskette drive, magnetic tape), an optical disk drive, and 3D XPoint memory. However, aspects are not limited to the above.

Unlike the non-volatile memory 31, the volatile memory 32 may be a memory that continuously requires power to maintain stored information. For example, the volatile memory 32 may include at least one of a Dynamic Random Access Memory (DRAM), a Static Random Access Memory (SRAM), a Synchronous Dynamic Random Access Memory (SDRAM), and a Double Data Rate SDRAM (DDR SDRAM). However, aspects are not limited to the above.

For example, each of the first non-volatile memory interface 40 and the second non-volatile memory interface 60 may include at least one of a Parallel Advanced Technology Attachment (PATA), a Small Computer System Interface (SCSI), a Serial Attached SCSI (SAS), a Serial Advanced Technology Attachment (SATA), and a PCI Express (PCIe). However, aspects are not limited to the above.

For example, each of first volatile memory interface 50 and the second volatile memory interface 70 may be at least one of a Single Data Rate (SDR), a Double Data Rate (DDR), a Quad Data Rate (QDR), an eXtreme Data Rate (XDR), and an octal data rate (ODR). However, aspects are not limited to the above.

The control interface 80 may be an interface for delivering control signals between the CPU 20 and the neural core SoC 10. The control interface 80 may transmit a command of the CPU 20 and transmit a response of the neural core SoC 10 to the command. For example, the control interface 80 may be PCI Express (PCIe), but is not limited thereto.

Figure 9:
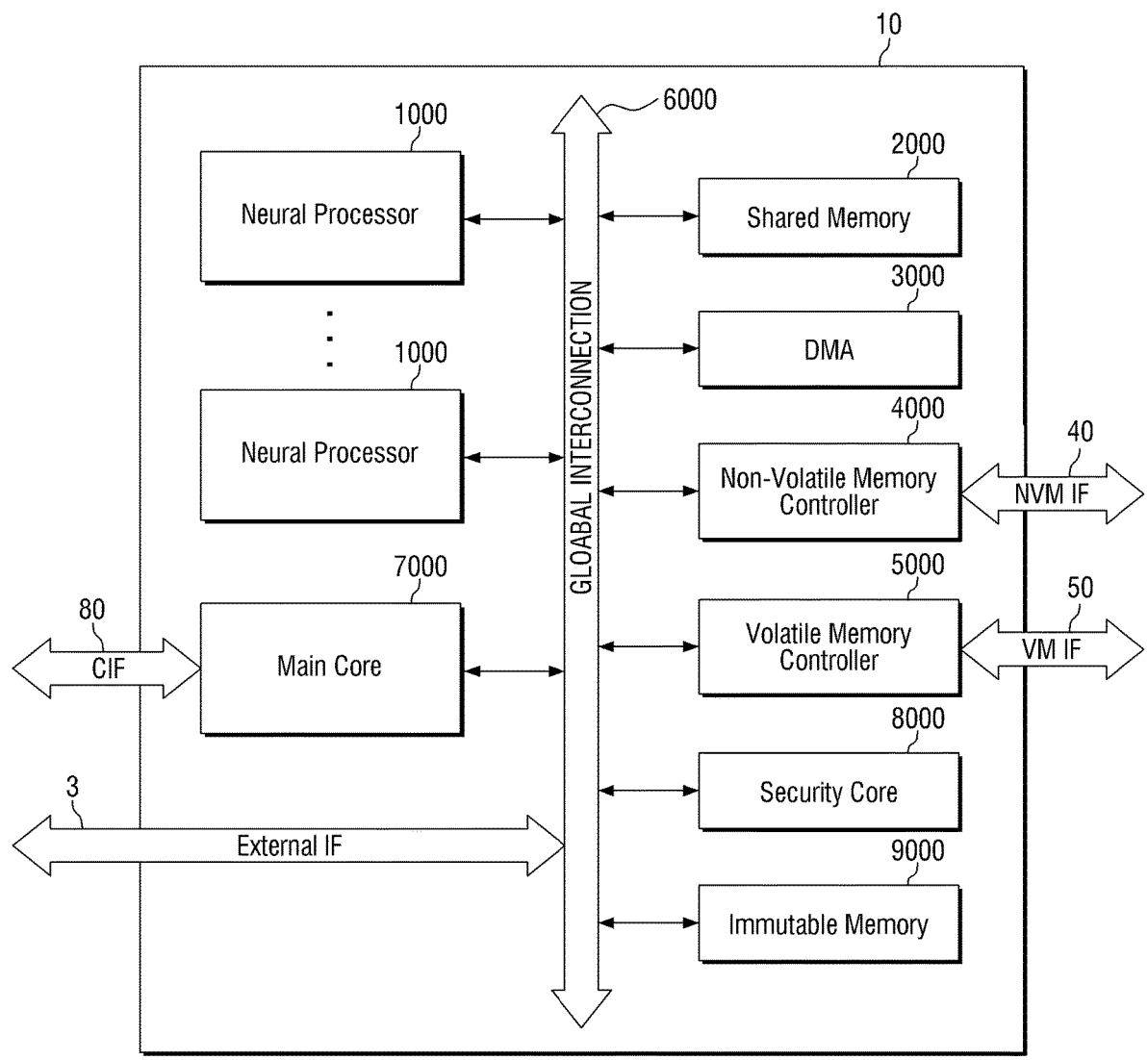
FIG. 9 is a block diagram provided to explain the neural core SoC of FIG. 8 in detail.

FIG. 9 is a block diagram provided to explain the neural core SoC of FIG. 8 in detail.

FIGS. 8 and 9, the neural core SoC 10 may include at least one neural processor 1000, a shared memory 2000, a Direct Memory Access (DMA) 3000, a non-volatile memory controller 4000, a volatile memory controller 5000, a main core 7000, a security core 8000, an immutable memory 9000, and a global interconnection 6000.

The neural processor 1000 may be a computational unit that directly performs computational tasks. If there are a plurality of neural processors 1000, the computational tasks may be allocated to each of the neural processors 1000. Each of the neural processors 1000 may be connected to each other through the global interconnection 6000.

The shared memory 2000 may be a memory shared by several neural processors 1000. The shared memory 2000 may store data of each neural processor 1000. In addition, the shared memory 2000 may receive data from the off-chip memory 30, temporarily store the data, and transmit the data to each neural processor 1000. Conversely, the shared memory 2000 may receive data from the neural processor 1000, temporarily store the data, and transmit the data to the off-chip memory 30 of FIG. 8.

The shared memory 2000 may require a relatively fast memory. Accordingly, the shared memory 2000 may include SRAM, for example. However, aspects are not limited to the above. That is, the shared memory 2000 may include DRAM.

The shared memory 2000 may be a memory corresponding to an SoC level, that is, to level 2 (L2). Accordingly, the shared memory 2000 may be defined as the L2 shared memory.

The DMA 3000 may directly control data movement without requiring the CPU 20 or the neural processor 1000 to control input/output of data. Accordingly, the DMA 3000 may control the data movement between memories to minimize the number of interrupts of the CPU or neural processor 1000.

The DMA 3000 may control the data movement between the shared memory 2000 and the off-chip memory 30. The non-volatile memory controller 4000 and the volatile memory controller 5000 may perform the movement of data through the authority of the DMA 3000.

The non-volatile memory controller 4000 may control read or write operation of the non-volatile memory 31. The non-volatile memory controller 4000 may control the non-volatile memory 31 through the first non-volatile memory interface 40.

The volatile memory controller 5000 may control the read or write operation of the volatile memory 32. In addition, the volatile memory controller 5000 may perform a refresh operation of the volatile memory 32. The volatile memory controller 5000 may control the volatile memory 32 through the first volatile memory interface 50.

The main core 7000 may be connected to the control interface 80. The main core 7000 may receive a control signal from the CPU 20 through the control interface 80. The main core 7000 may generate a task through a control signal received from the CPU 20 and transmit the task to each neural processor 1000. In addition, the main core 7000 may receive a task completion report from each neural processor 1000.

The global interconnection 6000 may connect at least one neural processor 1000, the shared memory 2000, the DMA 3000, the non-volatile memory controller 4000, the main core 7000, and the volatile memory controller 5000 to each other. In addition, the external interface 3 may also be connected to the global interconnection 6000. The global interconnection 6000 may be a path through which data moves between at least one neural processor 1000, the shared memory 2000, the DMA 3000, the non-volatile memory controller 4000, the volatile memory controller 5000, the main core 7000 and the external interface 3.

The global interconnection 6000 may transmit not only the data, but also control signals and signals for synchronization. In the neural processing device according to some examples of the disclosure, each neural processor 1000 may directly transmit and receive a synchronization signal. Accordingly, latency due to transmission of the synchronization signal generated by the main core 7000 may be minimized.

That is, when there are multiple neural processors 1000, there may be a dependency of individual tasks in which the task of one neural processor 1000 must be completed before the next neural processor 1000 may start a new task. The end and start of these individual tasks may be confirmed through synchronization signals, but according to the existing technology, the main core 7000 or the host, that is, the CPU 20 is in full charge of receiving the synchronization signal and instructing the start of a new task.

However, as the number of neural processors 1000 increases and the dependency of the tasks is designed more complexly, the number of these synchronization signals increases exponentially, and the latency according to each synchronization signal may significantly reduce the efficiency of the tasks.

Therefore, in the neural processing device according to some examples of the disclosure, instead of the main core 7000, each neural processor 1000 may directly transmit part of the synchronization signal to the other neural processors 1000 according to the dependency of the task. In this case, compared to the way of managing by the main core 7000, multiple neural processors 1000 may perform synchronization tasks in parallel, thereby minimizing latency due to synchronization.

In addition, the main core 7000 also performs task scheduling of the neural processors 1000 according to task dependency, and the overhead of such scheduling may increase significantly as the number of neural processors 1000 increases. Accordingly, in the neural processing device according to some examples of the disclosure, the scheduling task is partially performed by the individual neural processor 1000, which may reduce the scheduling burden and thus improve the performance of the device.

The security core 8000 is a device for performing secure booting of the neural core SoC 10, and the immutable memory 9000 may be a non-tamperable memory for storing the Root of Trust. The main core 7000, the security core 8000, and the immutable memory 9000 may be the same as the main core (MC), the security core (SC), and the immutable memory (IM) of FIGS. 1 to 6, respectively.

Figure 10:
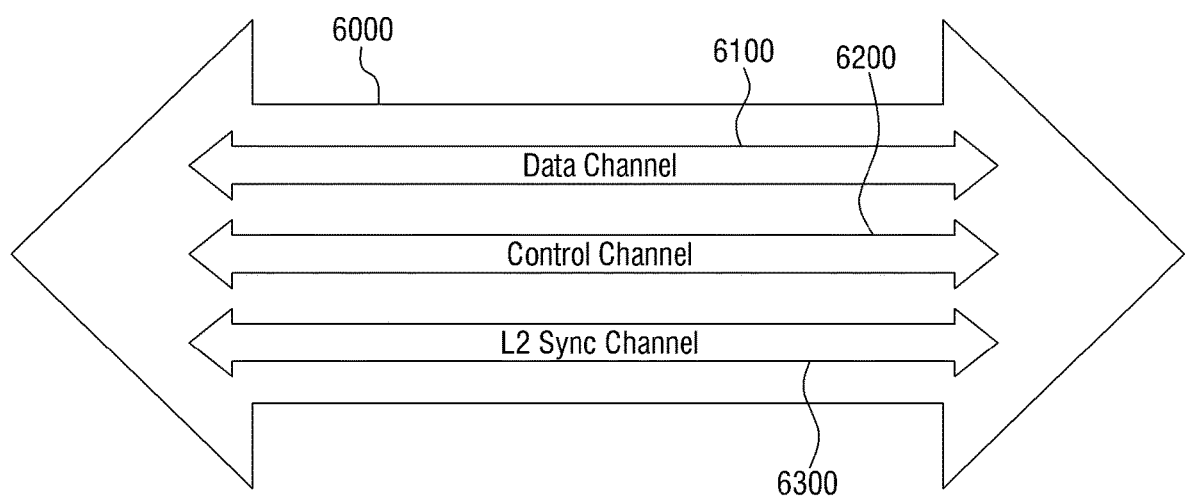
FIG. 10 is a structural diagram provided to explain the global interconnection of FIG. 9 in detail.

FIG. 10 is a structural diagram provided to explain the global interconnection of FIG. 9 in detail.

Referring to FIG. 10, the global interconnection 6000 may include a data channel 6100, a control channel 6200, and an L2 sync channel 6300.

The data channel 6100 may be a dedicated channel for transmitting data. Through the data channel 6100, at least one neural processor 1000, the shared memory 2000, the DMA 3000, the non-volatile memory controller 4000, the volatile memory controller 5000, and the external interface 3 may exchange data with each other.

The control channel 6200 may be a dedicated channel for transmitting control signals. Through the control channel 6200, at least one neural processor 1000, the shared memory 2000, the DMA 3000, the non-volatile memory controller 4000, the volatile memory controller 5000, the main core 7000, and the external interface 3 may exchange control signals with each other. In particular, the main core 7000 may transmit various control signals to each of the neural processors 1000.

The L2 sync channel 6300 may be a dedicated channel for transmitting synchronization signals. Through the L2 sync channel 6300, at least one neural processor 1000, the shared memory 2000, the DMA 3000, the non-volatile memory controller 4000, the volatile memory controller 5000, the main core 7000, and the external interface 3 may exchange the synchronization signals with each other.

The L2 sync channel 6300 is set as a dedicated channel inside the global interconnection 6000 so as to allow fast transmission of the synchronization signals without overlapping with other channels. Accordingly, the neural processing device may smoothly perform synchronization using the existing global interconnection 6000 without requiring new wiring work.

Figure 11:
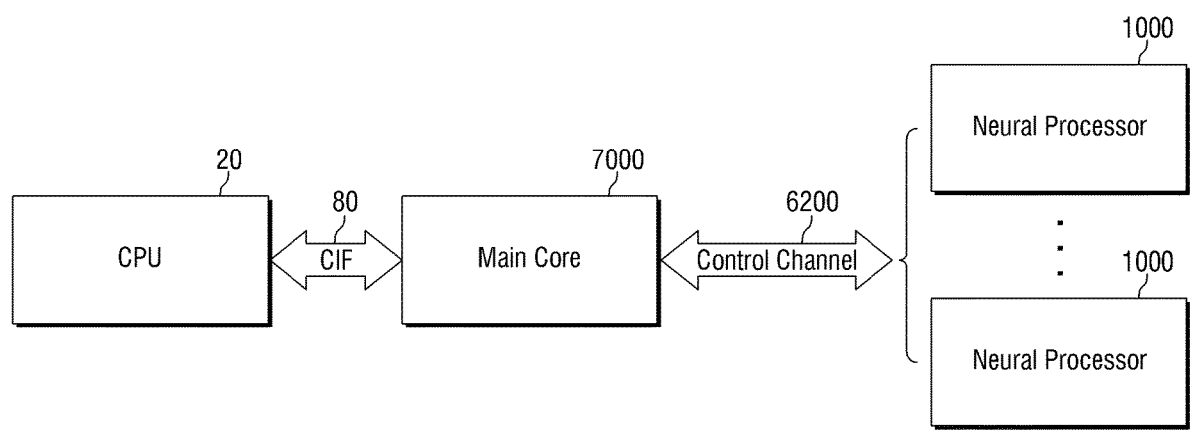
FIG. 11 is a block diagram provided to explain the flow of control signals of the neural processing device of FIG. 7.

FIG. 11 is a block diagram provided to explain the flow of control signals of the neural processing device of FIG. 7.

Referring to FIG. 11, the CPU 20 may transfer a control signal to the main core 7000 through the control interface 80. The control signal may be a signal to instruct to perform each operation, such as a computational task or a data load/store task.

The main core 7000 may receive a control signal and transmit the control signal to at least one neural processor 1000 through the control channel 6200. Each control signal may be stored as each task in the neural processor 1000.

Figure 12:
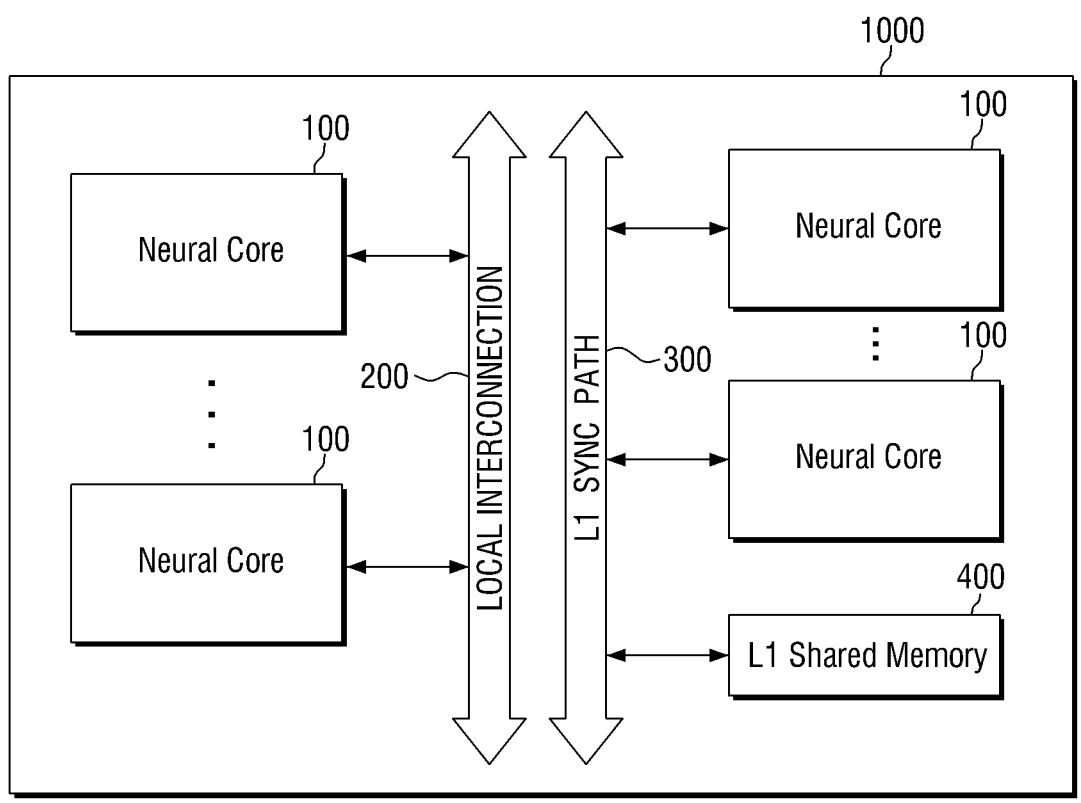
FIG. 12 is a block diagram provided to explain the neural processor of FIG. 9 in detail.

FIG. 12 is a block diagram provided to explain the neural processor of FIG. 9 in detail.

Referring to FIGS. 9 to 12, the neural processor 1000 may include at least one neural core 100, a local interconnection 200, an L1 sync path 300, and an L1 shared memory 400.

At least one neural core 100 may divide and perform the task of the neural processor 1000. For example, there may be eight neural cores 100. However, aspects are not limited to the above. Although it is shown in FIGS. 3 and 5 that several neural cores 100 are included in the neural processor 1000, aspects are not limited to the above. That is, the neural processor 1000 may be configured with only one neural core 100.

The L1 shared memory 400 may be a memory shared by each neural core 100 in the neural processor 1000. The L1 shared memory 400 may store data of each neural core 100. In addition, the L1 shared memory 400 may receive data from the shared memory 2000 of FIG. 4, temporarily store the data, and transmit the data to each neural core 100. Conversely, the L1 shared memory 400 may receive data from the neural core 100, temporarily store the data, and transfer the data to the shared memory 2000 of FIG. 3.

The L1 shared memory 400 may be a memory corresponding to the neural processor level, that is, to level 1 (L1). The L2 shared memory, that is, the shared memory 2000 may be shared by the neural processor 1000, and the L1 shared memory 400 may be shared by the neural core 100.

The local interconnection 200 may connect at least one neural core 100 and the L1 shared memory 400 to each other. The local interconnection 200 may be a path through which data moves between at least one neural core 100 and the L1 shared memory 400. The local interconnection 200 is connected to the global interconnection 6000 of FIG. 3 and may transmit data.

The L1 sync path 300 may connect at least one neural core 100 and the L1 shared memory 400 to each other. The L1 sync path 300 may be a path through which synchronization signals of at least one neural core 100 and the L1 shared memory 400 move.

The L1 sync path 300 may be formed physically separately from the local interconnection 200. Unlike the global interconnection 6000, the local interconnection 200 may not have sufficient channels formed therein. In this case, the L1 sync path 300 is formed separately such that it is possible to perform transfer of the synchronization signal quickly and without delay. The L1 sync path 300 may be used for synchronization performed at a level that is one level lower than the L2 sync channel 6300 of the global interconnection 6000.

Figure 13:
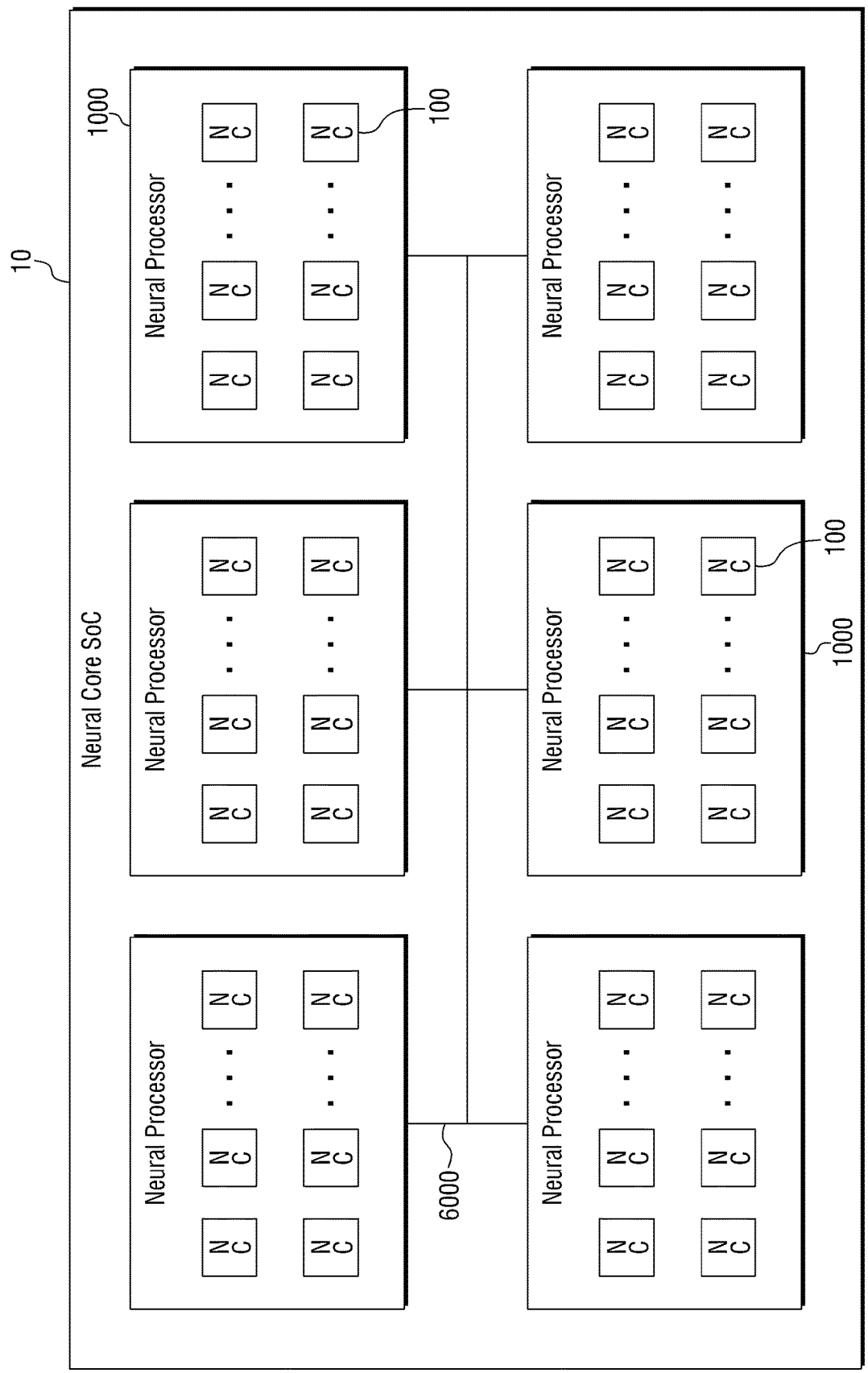
FIG. 13 is a diagram provided to explain a hierarchical structure of a neural processing device.

FIG. 13 is a diagram provided to explain a hierarchical structure of a neural processing device.

Referring to FIG. 13, the neural core SoC 10 may include at least one neural processor 1000. Each neural processor 1000 may transmit data to each other through the global interconnection 6000.

Each neural processor 1000 may include at least one neural core 100. The neural core 100 may be a processing unit optimized for deep learning computational tasks. The neural core 100 may be a processing unit corresponding to one operation of the deep learning computational task. In other words, the deep learning computational task may be expressed as a sequential or parallel combination of several operations. The neural core 100 is a processing unit that may each process one operation, and may be the minimum unit of computation that can be considered for scheduling from a compiler's perspective.

The neural processing device may achieve fast and efficient scheduling and performance of computational tasks by configuring the minimum unit of computation considered for scheduling from a compiler's perspective and the hardware processing unit on the same scale.

That is, if the hardware processing unit that may be divided is too large compared to the computational task, inefficiency in the computational task may occur when operating the processing unit. Conversely, it is not appropriate to always schedule the processing unit smaller than the operation that is the compiler's minimum scheduling unit, as this may result in scheduling inefficiencies and also increase hardware design costs.

Therefore, the scale of the compiler's scheduling unit and the hardware processing unit may be similarly adjusted to satisfy both the fast computational task scheduling and the efficient computational task performance without wasting hardware resources.

Figure 14:
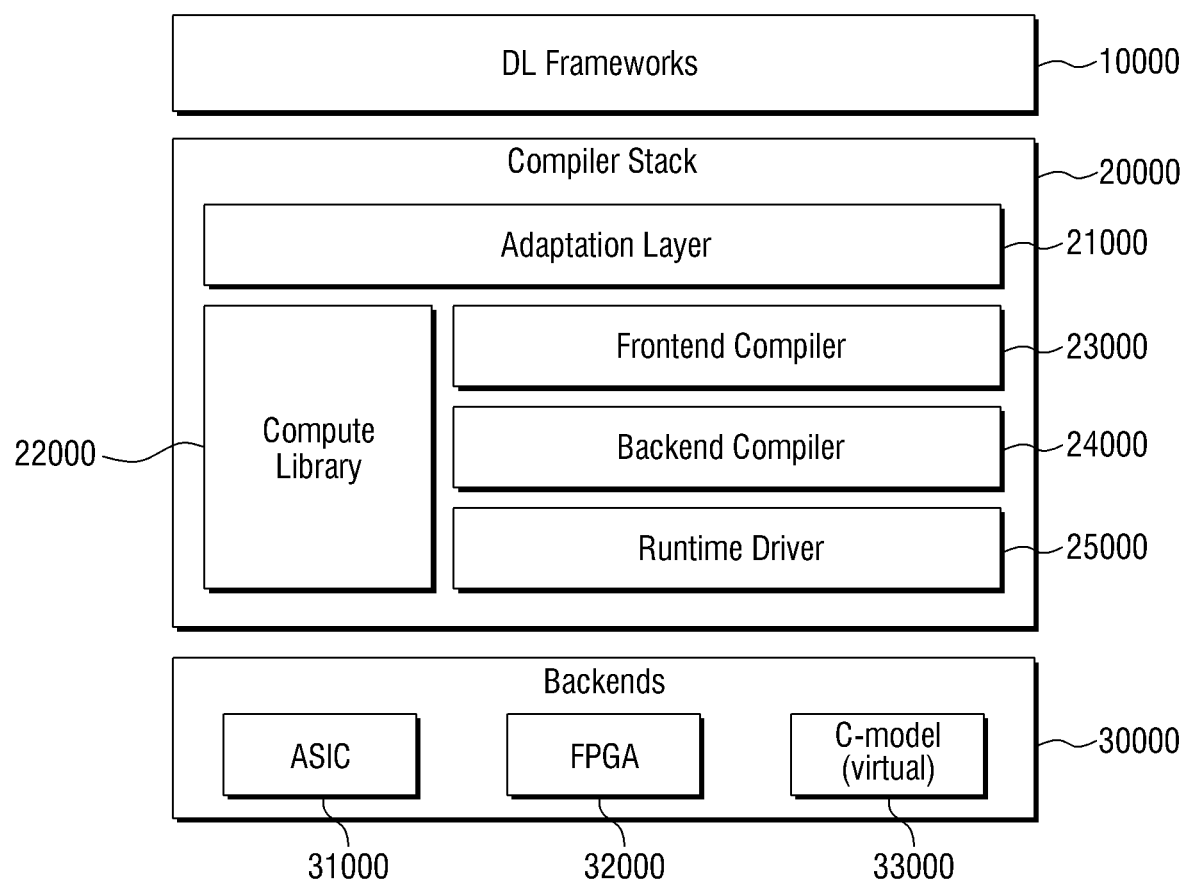
FIG. 14 is a block diagram provided to explain a software hierarchy of a neural processing device.

FIG. 14 is a block diagram provided to explain a software hierarchy of a neural processing device.

Referring to FIG. 14, the software layer structure of the neural processing device may include a DL framework 10000, a compiler stack 20000, and a backend module 30000.

The DL framework 10000 may refer to a framework for a deep learning model network used by the user. For example, a fully trained neural network may be generated using programs such as TensorFlow or PyTorch.

The compiler stack 20000 may include an adaptation layer 21000, a compute library 22000, a frontend compiler 23000, a backend compiler 24000, and a runtime driver 25000.

The adaptation layer 21000 may be a layer in contact with the DL framework 10000. The adaptation layer 21000 may quantize the user's neural network model generated in the DL framework 10000 and modify the graph. In addition, the adaptation layer 21000 may convert the type of the model into a required type.

The frontend compiler 23000 may convert various neural network models and graphs received from the adaptation layer 21000 into a certain intermediate representation (IR). The converted IR may be a preset expression that is easy to handle later in the backend compiler 24000.

The IR of the frontend compiler 23000 may be optimized in advance at the graph level. In addition, the frontend compiler 23000 may generate the IR by way of conversion into a hardware-optimized layout.

The backend compiler 24000 optimizes the IR converted in the frontend compiler 23000, and converts this into a binary file for use by the runtime driver. The backend compiler 24000 may generate optimized code by dividing the job at a scale that matches the details of the hardware.

Among various operations, the compute library 22000 may store template operations designed in a form suitable for hardware. The compute library 22000 provides the backend compiler 24000 with several template operations that require hardware, thereby generating optimized code.

During operation, the runtime driver 25000 may continuously perform monitoring so as to operate the neural network device. Specifically, it may be responsible for executing the interface of the neural network device.

The backend module 30000 may include an application specific integrated circuit (ASIC) 31000, a field programmable gate array (FPGA) 32000, and a C-model 33000. The ASIC 31000 may refer to a hardware chip determined according to a predetermined way of design. The FPGA 32000 may be a programmable hardware chip. The C-model 33000 may refer to a model implemented by simulating hardware on software.

The backend module 30000 may perform various tasks and derive results using binary code generated through the compiler stack 20000.

Figure 15:
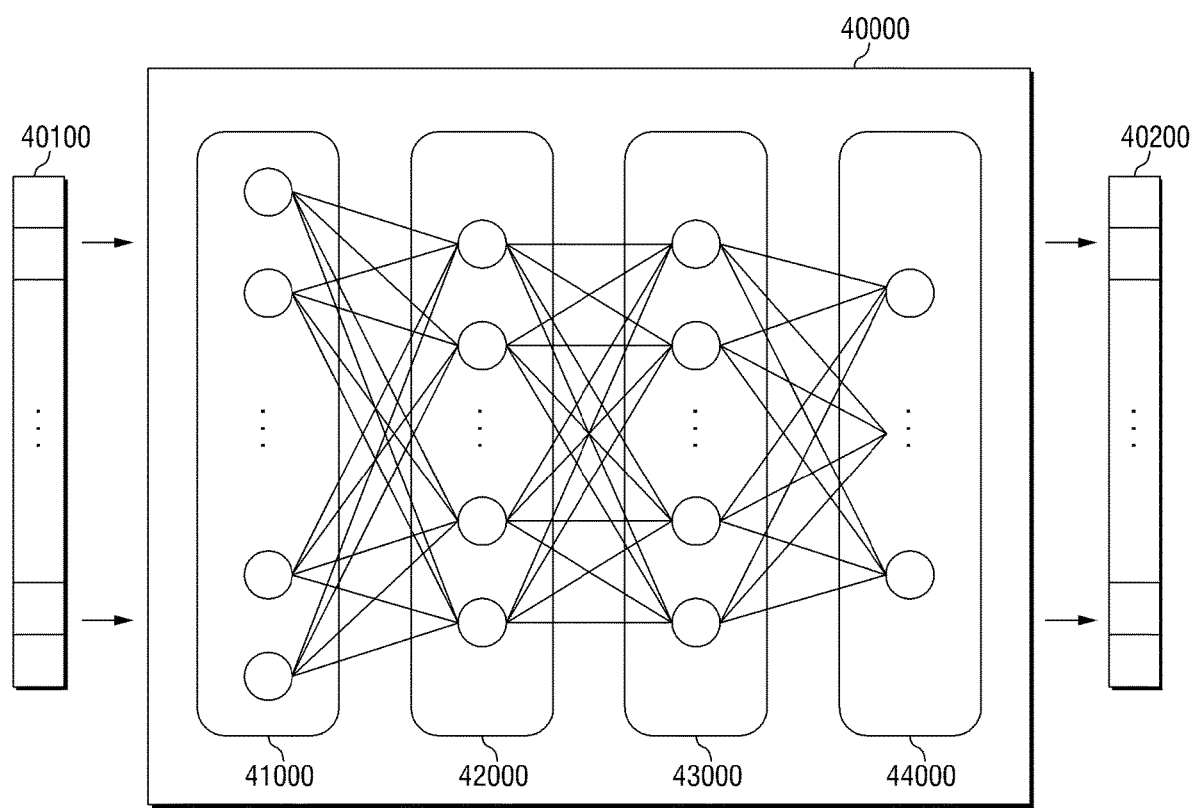
FIG. 15 is a conceptual diagram provided to explain a deep learning computation performed by a neural processing device.

FIG. 15 is a conceptual diagram provided to explain a deep learning computation performed by a neural processing device.

Referring to FIG. 15, in machine learning technology and cognitive science, the artificial neural network model 40000 as an example of the machine learning model refers to a statistical learning algorithm implemented based on a structure of a biological neural network, or to a structure that executes such algorithm.

The artificial neural network model 40000 may represent a machine learning model that acquires a problem solving ability by repeatedly adjusting the weights of synapses by the nodes that are artificial neurons forming the network through synaptic combinations as in the biological neural networks, thus training to reduce errors between a target output corresponding to a specific input and a deduced output. For example, the artificial neural network model 40000 may include any probability model, neural network model, and the like, that is used in artificial intelligence training methods such as machine learning and deep learning.

The neural processing device may perform computations by implementing this form of artificial neural network model 40000. For example, the artificial neural network model 40000 may receive an input image and output information on at least a portion of the object included in the input image.

The artificial neural network model 40000 is implemented as a multilayer perceptron (MLP) formed of multiple nodes and connections between them. The artificial neural network model 40000 may be implemented using one of various artificial neural network model structures including the MLP. As illustrated in FIG. 15, the artificial neural network model 40000 includes an input layer 41000 to receive an input signal or data 40100 from the outside, an output layer 44000 to output an output signal or data 40200 corresponding to the input data, and (n) number of hidden layers 42000 to 43000 (where n is a positive integer) positioned between the input layer 41000 and the output layer 44000 to receive a signal from the input layer 41000, extract the features, and transmit the features to the output layer 44000. The output layer 44000 receives signals from the hidden layers 42000 to 43000 and outputs the same to the outside.

The method of training the artificial neural network model 40000 includes the supervised learning that trains to optimize for solving a problem with inputs of teacher signals (correct answers), and the unsupervised learning that does not require a teacher signal.

The neural processing device may directly generate the training data for training the artificial neural network model 40000 through simulation. As described above, the input layer 41000 and the output layer 44000 of the artificial neural network model 40000 are respectively matched with a plurality of output variables corresponding to a plurality of input variables, and as the synaptic values between nodes included in the input layer 41000, the hidden layers 42000 to 43000, and the output layer 44000 are adjusted, training can be processed to extract a correct output corresponding to a specific input. Through this training process, the features hidden in the input variables of the artificial neural network model 40000 may be confirmed, and the synaptic values (or weights) between the nodes of the artificial neural network model 40000 may be adjusted so as to reduce the errors between the output variable calculated based on the input variable and the target output.

Figure 16:
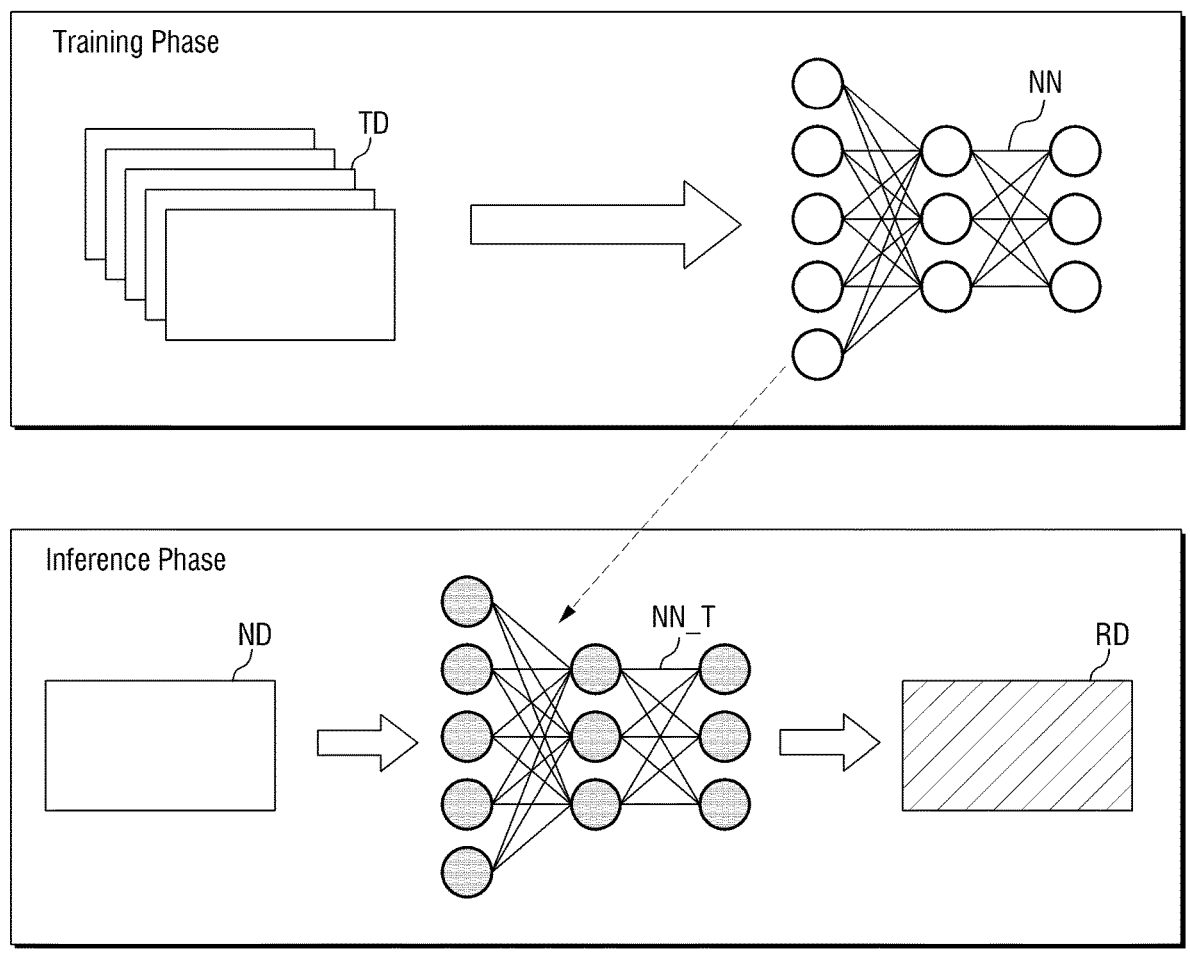
FIG. 16 is a conceptual diagram provided to explain training and inference operations of a neural network of a neural processing device.

FIG. 16 is a conceptual diagram provided to explain training and inference operations of the neural network of the neural processing device.

Referring to FIG. 16, in the training phase, a plurality of training data (TD) may go through the process of being forwarded to the artificial neural network model (NN) and then backwarded. Through this, the weights and biases of each node of the artificial neural network model (NN) are adjusted, and this allows the model to be trained to produce increasingly accurate results. Through this training phase, the artificial neural network model (NN) may be converted into the trained neural network model (NN_T).

In the inference phase, new data (ND) may be input back to the trained neural network model (NN_T). The trained neural network model (NN_T) may take the new data (ND) as input and derive the result data (RD) through previously trained weights and biases. For this result data (RD), which training materials (TD) are used in the training phase and how many training materials (TD) are used may be important.

Hereinafter, a method for secure booting of a processing device will be described with reference to FIGS. 17 and 18. The components or operations that overlap with those of the examples described above will be omitted or simplified. For the method for setting task dependency, reference may be made to FIGS. 1 to 16 and the related description provided above.

Figure 17:
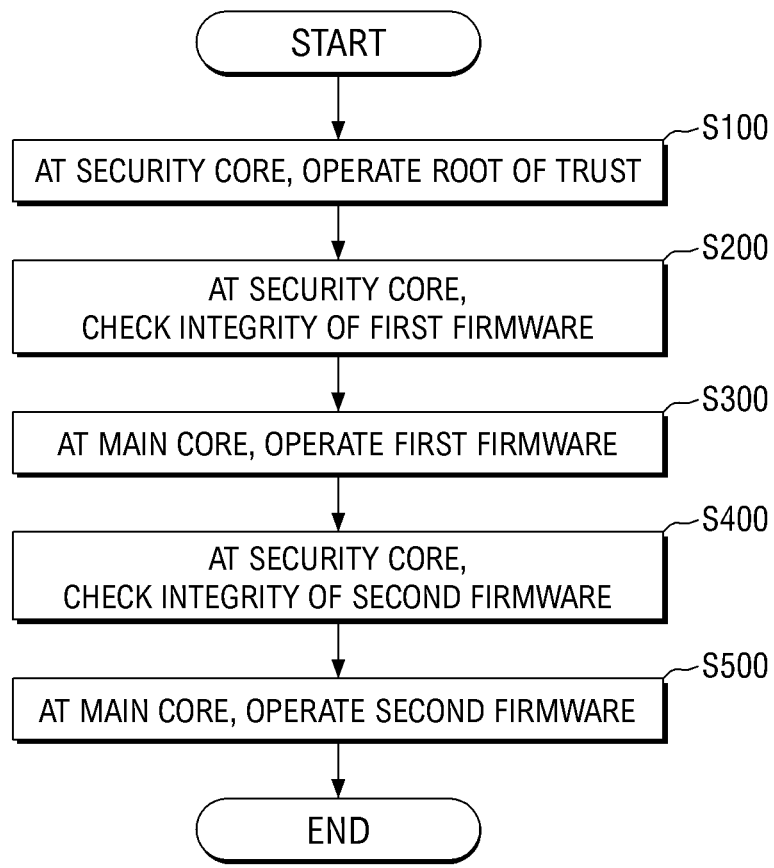
FIG. 17 is a flowchart illustrating a method for secure booting of a processing device.
Figure 18:
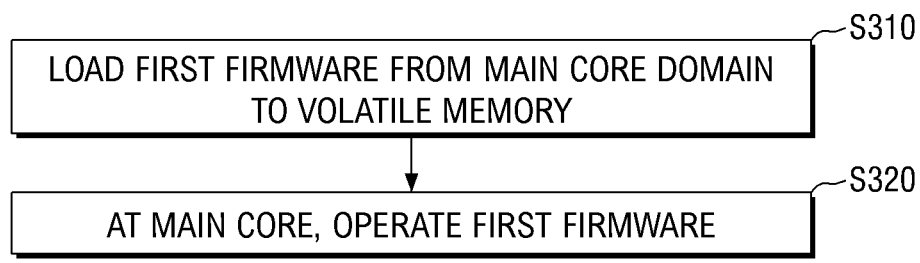
FIG. 18 is a flowchart provided to explain in detail the steps at the main core of FIG. 17 for operating first firmware.

FIG. 17 is a flowchart illustrating a method for secure booting of a processing device, and FIG. 18 is a flowchart provided to explain in detail the steps at the main core of FIG. 17 for operating the first firmware.

Referring to FIG. 17, the security core operates the Root of Trust, at S100.

Specifically, referring to FIG. 4, the Root of Trust (RoT) may be loaded to the security core domain (D_sc). Specifically, the security core (SC) may load the Root of Trust (RoT) to the third volatile memory (VM3) and operate the same.

Referring to FIG. 17 again, the security core checks the integrity of the first firmware, at S200.

Specifically, referring to FIGS. 5 and 6, the Root of Trust (RoT) operated by the security core (SC) may perform an integrity check on the first firmware (FW1).

Referring to FIG. 17 again, the main core operates the first firmware, at S300.

In detail, referring to FIG. 18, the first firmware is loaded from the main core domain to the volatile memory at S310, and the main core operates the first firmware at S320.

Specifically, referring to FIG. 4, the volatile memory (VM) of the main core domain (D_mc) may include at least one of the first volatile memory (VM1) and the third volatile memory (VM3). The main core domain (D_mc) may load the first firmware (FW1) integrity checked by the Root of Trust (RoT) and operate the same.

Referring to FIG. 17 again, the security core checks the integrity of the second firmware at S400, and then the main core operates the second firmware at S500.

Specifically, referring to FIGS. 5 and 6, the security core (SC) may perform an integrity check on the second firmware (FW2) through the Root of Trust (RoT). The main core (MC) may operate the integrity-checked second firmware (FW2). The second firmware (FW2) may be operated in the same manner as the first firmware (FW1) of FIG. 18. However, aspects are not limited to the above.

The above description is merely illustrative of the technical idea of the examples, and those of ordinary skill in the art to which the examples pertain will be able to make various modifications and variations without departing from the essential characteristics of the examples. Accordingly, the examples are not intended to limit the technical idea of the examples, but to explain the technical idea, and the scope of the technical idea of the examples is not limited by these examples. The scope of protection of the examples should be interpreted in accordance with the claims below, and all technical ideas within the equivalent scope should be interpreted as being included in the scope of claims of the examples.

The invention claimed is:

1. A processing device comprising:
a security core that operates a Root of Trust and sequentially performs an integrity check on first firmware and second firmware through the Root of Trust;
a main core that sequentially operates the first firmware and the second firmware;
a non-volatile memory storing the first firmware and the second firmware;
a first volatile memory that loads the first firmware and the second firmware from a main core domain of the main core and operates the loaded firmware with the main core; and
an immutable memory that stores the Root of Trust, wherein contents stored in the immutable memory are not tampered with.

2. The processing device according to claim 1, wherein the security core transfers the first and second firmware to the first volatile memory after the integrity check on the first and second firmware.

3. The processing device according to claim 1, wherein the security core includes a crypto accelerator that accelerates a cryptographic operation.

4. The processing device according to claim 1, wherein the security core further includes a main-security interface that controls data transfer from the main core to the security core.

5. The processing device according to claim 4, wherein the security core further includes a security-main interface that controls data transfer from the security core to the main core.

6. The processing device according to claim 5, further comprising an immutable memory interface that controls access of the security core to the immutable memory, wherein the main-security interface and the security-main interface are accessible to the main core and the security core, and
the immutable memory interface is accessible to the security core and inaccessible to the main core.

7. The processing device according to claim 1, wherein the security core performs the integrity check on the first firmware before the first firmware is operated.

8. The processing device according to claim 7, wherein the security core performs the integrity check on the second firmware before the second firmware is operated.

9. The processing device according to claim 8, wherein the operating the first firmware by the main core is performed in parallel with the integrity check on the second firmware by the security core.

10. The processing device according to claim 9, wherein time of operating the first firmware and time of the integrity check on the second firmware overlap with each other.

11. The processing device according to claim 1, wherein, if at least one of the first and second firmware is tampered with, the security core stops the operation of the main core.

12. The processing device according to claim 11, wherein, after stopping the operation of the main core, the security core initializes all data in the first volatile memory.

13. The processing device according to claim 12, wherein, if the first and second firmware are tampered with, the security core executes a recovery mode to replace the first and second firmware,
and the main core is limited in operation during the recovery mode.

14. The processing device according to claim 13, wherein, if the first and second firmware are normalized, the security core terminates the recovery mode and resumes the operation of the main core.

15. The processing device according to claim 1, further comprising:
at least one neural processor that receives a task descriptor from the main core and performs a task; and
a shared memory shared by the at least one neural processor.

16. A method for secure booting of a processing device, the method comprising:
at a security core, operating a Root of Trust;
at the security core, performing an integrity check on first firmware;
at a main core, operating the integrity-checked first firmware;
while the first firmware is operating, at the security core, performing an integrity check on second firmware; and
at the main core, operating the integrity-checked second firmware,
wherein the operating the Root of Trust at the security core includes operating the Root of Trust in an immutable memory that cannot be tampered with.

17. The method according to claim 16, wherein the operating the first firmware includes:
loading the first firmware from a main core domain of the main core to a volatile memory; and
at the main core, operating the first firmware.

18. The method according to claim 16, wherein the performing the integrity check on the first firmware at the security core includes:
decrypting an encryption code of the first firmware with a public key to derive a hash value of the first firmware, wherein the hash value of the first firmware is encrypted with a private key that asymmetrically corresponds to the public key; and
checking an integrity of the first firmware through the decrypted hash value.

* * * * *